(12) United States Patent
D'Amico et al.

(10) Patent No.: US 10,759,696 B2
(45) Date of Patent: Sep. 1, 2020

(54) CEMENT KILN FUEL TREATMENT

(71) Applicant: SCB International Holdings, LLC, Louisville, KY (US)

(72) Inventors: Peter D'Amico, Newtown, CT (US); Christopher Poling, Bel Air, MD (US); Thomas Lesniak, Clifton Park, NY (US)

(73) Assignee: SCB INTERNATIONAL HOLDINGS, LLC, Louisville, KY (US)

( * ) Notice: Subject to any disclaimer, the term of this patent is extended or adjusted under 35 U.S.C. 154(b) by 534 days.

(21) Appl. No.: 15/011,019

(22) Filed: Jan. 29, 2016

(65) Prior Publication Data

US 2016/0221872 A1 Aug. 4, 2016

Related U.S. Application Data

(60) Provisional application No. 62/110,292, filed on Jan. 30, 2015.

(51) Int. Cl.
*C04B 7/44* (2006.01)
*C10L 10/02* (2006.01)
*C04B 7/36* (2006.01)

(52) U.S. Cl.
CPC ............ *C04B 7/4407* (2013.01); *C04B 7/364* (2013.01); *C10L 10/02* (2013.01); *F23J 2215/20* (2013.01)

(58) Field of Classification Search
CPC .......... C04B 7/364; C04B 7/365; C04B 7/367
See application file for complete search history.

(56) References Cited

U.S. PATENT DOCUMENTS 3,425,853 A * 2/1969 Jean ........................ C04B 7/00
106/742
4,248,639 A * 2/1981 Quittkat ................ F27B 7/2033
106/759
4,262,610 A * 4/1981 Hein ......................... F23J 7/00
110/218

(Continued)

FOREIGN PATENT DOCUMENTS

WO 0119749 A1 3/2001

OTHER PUBLICATIONS

Extended European Search Report issued by the European Patent Office dated Aug. 10, 2018, for related European Patent Application No. 16744207.8.

(Continued)

*Primary Examiner* — David J Laux
(74) *Attorney, Agent, or Firm* — Moore & Van Allen PLLC; Henry B. Ward, III

(57) ABSTRACT

A method of treating cement kiln fuel includes introducing an additive to a fuel component to form a fuel mixture. The fuel component includes a sulfur-generating combustible fuel and the additive includes a micronized lime component. The method further includes combusting the fuel component within a cement kiln. The sulfur generated by the combustion of the combustible fuel forms calcium-containing sulfur compounds with lime provided by the micronized lime component. The calcium-containing sulfur compounds fall to a bed of clinker forming beneath the flame and some portion thereof may become resident in the clinker.

26 Claims, 5 Drawing Sheets

(56) References Cited

U.S. PATENT DOCUMENTS

| | | | | |
|---|---|---|---|---|
| 4,509,436 | A | * | 4/1985 | Schrofelbauer ...... B01D 53/508 110/204 |
| 4,560,561 | A | * | 12/1985 | Henderson ............. A23K 40/20 426/454 |
| 4,638,747 | A | * | 1/1987 | Brock .................... E01C 19/10 110/101 CC |
| 5,049,163 | A | | 9/1991 | Huang et al. |
| 5,458,659 | A | * | 10/1995 | Ashworth ............... F23B 90/06 208/404 |
| 5,695,130 | A | | 12/1997 | Csendes |
| 6,468,345 | B1 | * | 10/2002 | Zhu ...................... B01D 53/508 106/705 |
| 7,056,359 | B1 | * | 6/2006 | Somerville ............ C10L 5/363 44/503 |
| 8,328,550 | B2 | * | 12/2012 | Gasser ................. C04B 7/4446 432/14 |
| 8,470,273 | B2 | * | 6/2013 | Saito .................. B01D 53/8625 423/210 |
| 9,278,311 | B2 | * | 3/2016 | Radway ................ B01D 53/60 |
| 2001/0002247 | A1 | | 5/2001 | Suda et al. |
| 2003/0106467 | A1 | * | 6/2003 | Jones, Jr. ................ C04B 18/08 106/745 |
| 2009/0025614 | A1 | | 1/2009 | Zhang et al. |
| 2014/0020399 | A1 | | 1/2014 | Hueller |
| 2014/0299028 | A1 | * | 10/2014 | Kotch .................... C10L 10/02 110/342 |
| 2015/0027181 | A1 | | 1/2015 | Ginn et al. |

OTHER PUBLICATIONS

International Search Report dated May 24, 2016, for corresponding International Patent Application No. PCT/US2016/015724.
Written Opinion dated May 24, 2016, for corresponding International Patent Application No. PCT/US2016/015724.
International Preliminary Report on Patentability dated Aug. 1, 2017, for corresponding International Patent Application No. PCT/US2016/015724.
Office Action issued by the European Patent Office for corresponding European Patent Application No. 16744207.8 dated Apr. 3, 2019.
First Examination Report issued by the Indian Patent Office for corresponding Indian Patent Application No. 201747025327 dated May 30, 2019.
European Office Action issued by the European Patent Office corresponding to European Patent Application No. 16744207.8, dated Nov. 7, 2019, 4 pages.
European Office Action issued by the European Patent Office corresponding to European Patent Application No. 16744207.8, dated Jul. 21, 2020, 4 pages.

* cited by examiner

CEMENT KILN FUEL TREATMENT

CROSS REFERENCES TO RELATED APPLICATIONS

This application claims the benefit of U.S. Provisional Patent Application Ser. No. 62/110,292, filed on Jan. 30, 2015, the contents of which are incorporated herein by reference in their entirety.

FIELD

The present disclosure relates to cement kilns, and more particularly to treatment of fuel used in cement kilns.

BACKGROUND

Cement kiln exhaust gases typically include certain undesirable or regulated pollutants such as oxides of carbon, sulfur, and nitrogen, alkalis, excess chlorides and volatile heavy metals such as mercury. Current methods used to clean cement kiln exhaust gas include sorbent technologies and flue gas desulfurization scrubbers. Controlling exhaust gas emissions may also be performed by controlling the pollutants released by using, for example, "cleaner" fuels, but such cleaner fuels may be more expensive to obtain than other fuels or grades with higher potential pollutant levels. Accordingly, whatever method or combinations of methods of controlling pollutants in the cement-making process are involved, they are associated with substantial cost burdens to cement kiln operations, and it would be desirable to reduce such burdens.

SUMMARY

In one aspect, a method of treating cement kiln fuel involves adding lime to a sulfur-generating combustible fuel, and combusting the fuel in the presence of the lime in a cement kiln. As a result of the combustion process, one or more calcium-containing sulfur compounds, such as gypsum, are formed. Some or all of the gypsum may fall to a bed of clinker forming along a burning zone within the kiln or may become part of the clinker. The sulfur in such gypsum is thus removed from the cement kiln exhaust gas stream. The resulting removal of sulfur from the exhaust gas results in a corresponding lowering of sulfur emissions, such as sulfur-dioxide, at the cement kiln stack.

The combustible fuel may be any number of carbonaceous solids or liquids, such as coal, petcoke or other carbonaceous solids and liquids. The lime additive may comprise micronized lime or a micronized lime component. The micronized lime component may have an average particle size of about 1.0 microns or less, such as about 0.5 microns or less. The micronized lime may include calcium carbonate, either as a predominant component or in combination with other compounds, whether calcium-containing or not.

Some or all of the resulting calcium-containing sulfur compounds may exit the kiln in the exhaust gas and may become resident in cement kiln dust. The method may comprise collecting the calcium-containing sulfur compounds resident in the cement kiln dust with a particulate collection system.

The micronized lime component may be obtained from a calcium carbonate waste material or "float". The micronized lime may be introduced as a dry particulate, and may be introduced directly onto a coal (or other carbonaceous solid) feed belt at any number of locations, including when a fuel mixture is entering the mill or into the pneumatic stream of pulverized coal/fuel heading to the burner.

Introducing the micronized lime to the fuel may also be accomplished at the burner or at any number of other points prior to the burner.

In addition, treating the fuel component with the lime may involve a variety of methods, so long as the lime is associated with the fuel component so as to react sufficiently therewith to form one or more calcium-containing sulfur compounds. To that end, the lime may be introduced to the coal feed belt entering the mill, into a pneumatic stream in which ground particulates of the fuel component are being passed to either a burner or a storage unit, onto a surface of the fuel component, or the like, and such treatment, again, may occur at the point of fuel combustion or any time prior thereto, including, for example, prior to processing the fuel in a fuel mill, after the fuel mill, and at still other points prior to combustion, including, for example, interprocessing the fuel component and the additive in the fuel mill.

The combustible fuel component being treated may be part of a fuel mixture of any constituents suitable for cement kilns and thus may comprise one or more dry process fuels, such as coal, petcoke, biomass, agriculture byproducts, paper ash, paper, saw dust, and construction materials.

In another aspect, a cement kiln system may be configured to incorporate fuel-generated sulfur into clinker. The system may include a fuel supply configured to supply a fuel component of a fuel mixture. The fuel component may comprise a sulfur-generating combustible fuel. The system may further include an additive supply configured to supply a micronized lime component to the fuel component to form a fuel mixture. A burner may be included that is configured to receive the fuel mixture. The burner may include a burner tip positioned to deliver the fuel mixture into a combustion zone of a cement kiln and configured to combust the fuel component therein to produce a flame, wherein the flame defines a high temperature burning zone within the kiln. The sulfur generated by the combustion of the fuel component and lime provided by the micronized lime component may form calcium-containing sulfur compounds within the combustion zone or surrounding high temperature burning zone when the fuel component is combusted. A clinker bed of forming clinker may extend along the burning zone beneath the flame. The clinker bed may be positioned to catch calcium-containing sulfur compounds falling to the clinker bed. The calcium-containing sulfur compounds falling to the clinker bed may remain thereon or may coat or become part of the forming clinker, or may exit the kiln within or as a component of the cement kiln dust.

The system may include a fuel mill wherein the fuel mill is coupled to the fuel supply to receive the fuel component. The additive supply may be configured to supply the micronize lime to the fuel component prior to the fuel mill. The fuel mill may be configured to intergrind the fuel component and the micronized lime. The burner may be configured to receive the fuel mixture directly from the fuel mill. The system may include a storage unit coupled to the fuel mill for storing the interground fuel mixture. The additive supply may be configured to supply the micronized lime to the fuel component after the fuel mill to form the fuel mixture. The system may further include a storage unit coupled to the fuel mill for receiving the fuel component from the fuel mill, wherein the micronized lime is supplied to the fuel component at the storage unit.

BRIEF DESCRIPTION OF THE DRAWINGS

The various features and advantages of the inventive arrangements and the manner of attaining them will become more apparent and the disclosure itself will be better understood by reference to the following description of embodiments taken in conjunction with the accompanying drawings, it being understood, however, the inventive arrangements are not limited to the precise arrangements and instrumentalities shown, wherein.

DESCRIPTION

Figure 1:
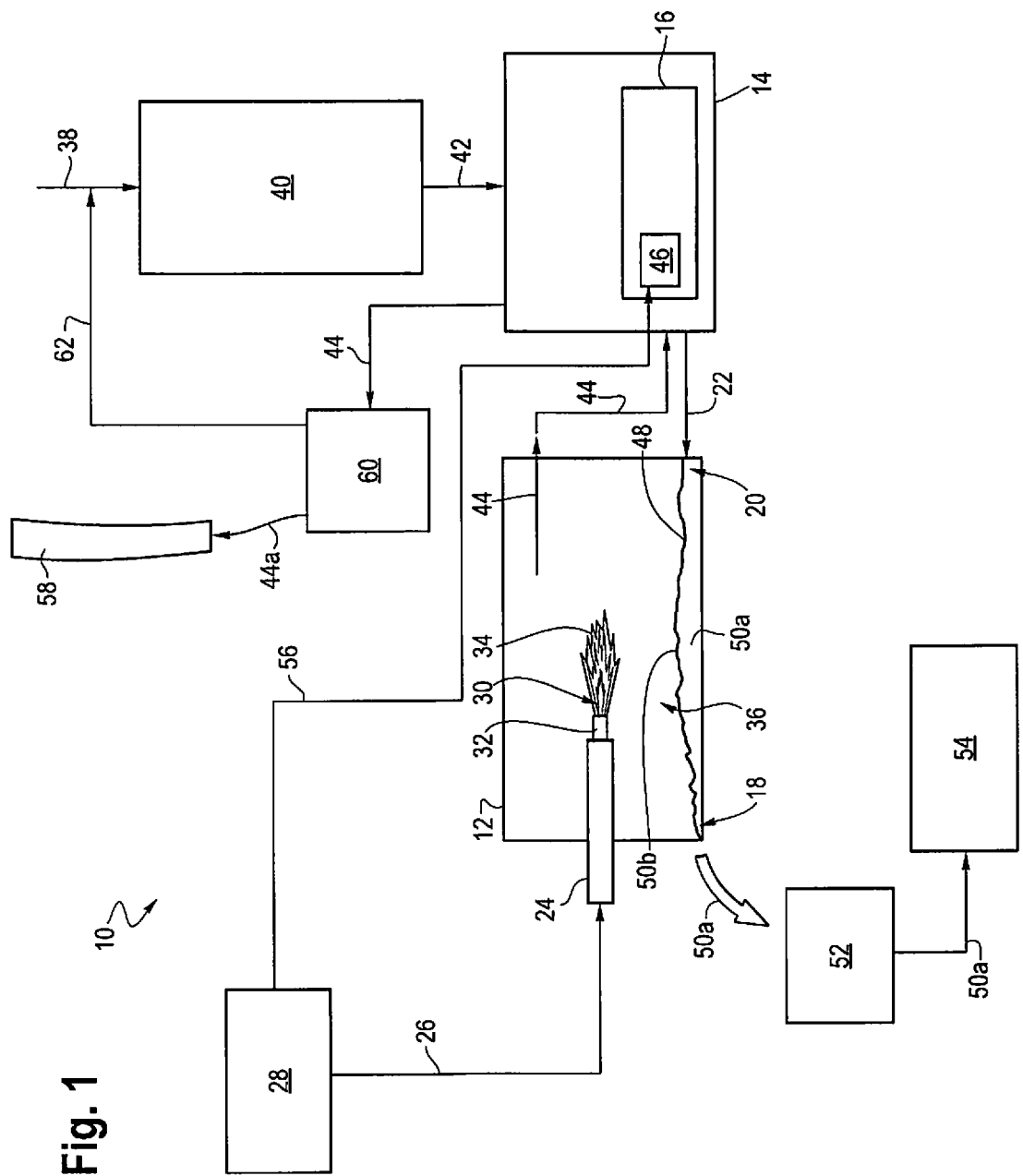
FIG. 1 illustrates a cement kiln system for use with a clinker production process utilizing a dry process rotary kiln according to various embodiments described herein.

Cement is a binder substance that generally comprises a mixture of calcium aluminosilicate and calcium sulfate. Traditional cement production methods include heating raw materials such as limestone and other substances that contain silica, iron, and alumina such as clay. Heating the raw materials typically takes place in a cement kiln designed for thermally processing and chemically altering the raw materials to form clinker nodules. Portland cement clinker, for example, is made by heating a mixture of raw materials to a calcining temperature of above about 600° C. (1,112° F.) and then to a fusion temperature of about 1,450° C. (2,640° F.) to sinter the materials into clinker nodules. The clinker mixture is then cooled and subjected to further processed steps such a grinding and addition of calcium sulfate (gypsum) to control set times.

The composition of cement kiln exhaust gas includes gases and compounds generated, released, or volatilized during the clinkering production process, e.g., from the thermal processing of the raw materials as well as the combustion of fuels used to generate the high temperature kiln environment. Typical combustible fuels used in modern North American cement kilns include dry process fuels. Examples of dry process fuels include one or a combination of coal, petcoke, and alternative fuels such as biomass, agriculture byproducts, paper ash, paper, saw dust, various construction materials, and combinations thereof. Liquid fuels such as liquefied coal, oil, or tar may also be used. The composition of these gases typically includes oxides of carbon, sulfur, nitrogen, alkalis, excess chlorides and volatile heavy metals such as mercury. The exhaust gases must ultimately exit the kiln stack.

Compliance with environmental regulations generally requires kiln operators to treat exhaust gases or otherwise limit pollutant levels prior to emission from the stack. For example, cement kiln exhaust gas may be treated with sorbent technologies and flue gas desulphurization scrubbers to remove sulfur and other undesirable pollutants. Kiln operators may also attempt to limit generation of pollutants by eliminating or reducing the presence of associated reactants and products in the raw materials or fuel used in kiln operation. For example, a low sulfur fuel such as a clean coal may be combusted to reduce a sulfur content, such as sulfur dioxide, in the exhaust gas. However, while clean inputs may be used to reduce treatment burden, these savings may be offset by the increased costs of the clean inputs.

Described herein are systems and methods for reducing sulfur levels in cement kiln exhaust gas generated by the combustion and thermal decomposition of a sulfur-generating fuel. According to various embodiments, a fuel mixture supplied to a combustion zone of a kiln includes a sulfur-generating fuel component and an additive comprising a lime component. The lime component comprises a lime, lime mix, or a lime composition introduced into the combustion zone of the kiln. For example, according to various embodiments, the lime component may comprise a calcium oxide, a calcium hydroxide, a calcium carbonate, any of the foregoing alone or in a combination thereof. In one embodiment, the lime component includes a micronized calcium carbonate from a suitable source. In other instances, the source of the lime component may be limestone, a limestone composition, or industrial float or other waste material containing calcium carbonate that has been micronized or is otherwise in micronized form.

The limestone or calcium carbonate-containing material is then added to the cement kiln fuel. In one embodiment, the additive comprises a composition composed predominantly of the lime component. For example, in one embodiment, the additive comprises a material composed predominantly of a calcium carbonate. In other embodiments, the additive may comprise argillaceous limestone containing calcium carbonate, or dolomite or dolomitic limestone, which may include calcium magnesium carbonate among its constituents.

The fuel mixture is formulated such that combustion of the fuel component in the combustion zone results in reaction of the sulfur arising from the decomposition of the fuel component with the lime to form calcium-containing sulfur compounds. The reaction may occur within the combustion zone or proximate thereto within the high temperature burning zone within the kiln. In various embodiments, formulating the fuel mixture includes introduction of the lime component comprising adding micronized lime having an average particle size of 1 micron (+1-0.5 microns) to the fuel component, or treating the fuel component with the micronized lime in any suitable manner, so that the micronized lime reacts with the fuel component. In a further embodiment, the micronized lime may have an average particle size of 1 micron or less, such as 0.5 microns or less. In one implementation, the lime component may be applied directly onto preprocess coal as the coal is entering the fuel mill on a coal feed belt. In a further implementation, the lime component may be introduced into a pneumatic stream containing the fuel component, e.g., a pneumatic stream of pulverized coal being blown in or otherwise transferred from a fuel mill to the kiln burner.

The lime component is preferably present in the fuel mixture as a fine micronized powder or particulate when the fuel component is combusted. For example, in one embodiment, the lime component is present in the fuel mixture as a micronized particulate having an average particle size of about 1.0 microns or less, or about 0.5 microns or less. The lime component is preferably introduced or mixed with the fuel component in a dry form. However, it is contemplated that the lime component may be introduced to the fuel component in a liquid, such as a carrier liquid, and the resultant fuel mixture may be supplied to the burner for combustion including the carrier liquid or upon evaporation of the carrier liquid. In one implementation, a liquid carrier containing the lime component may be sprayed or misted onto a preprocess fuel component or into a pneumatic stream of a processed fuel component such as ground coal. The carrier liquid may be a solution, mixture, or suspension in which the lime component is present. The carrier liquid may be formulated to evaporate prior to supply of the fuel mixture to the burner. The carrier liquid may also be formulated to evaporate upon exposure to the high temperatures generated within the combustion zone. The lime component may separate from the carrier liquid into lime particulates suitable for formation of calcium-containing sulfur compounds with sulfur generated from the combustion of the fuel component. Notably, providing the lime component within a carrier liquid may increase the amount of energy that must be applied to the combustion zone to produce the same amount of clinker produced using a dry additive form of the lime component.

The micronized lime of the lime component combines with sulfur generated from the combustion of the fuel component on a molar basis to form various calcium-containing sulfur compounds, such as calcium sulfate or gypsum/synthetic gypsum. The calcium-containing sulfur compounds may separate from the exhaust gas stream in any number of ways, depending on the temperature, structural, or other environmental parameters related to the cement kiln. For example, the calcium-containing sulfur compounds may include particulates, and such particulates may deposit directly onto the clinker forming within a burning zone of the kiln. The particulate may likewise settle onto the bed as dust. The calcium-containing sulfur compounds may likewise become incorporated or integrated within clinker nodules present in the kiln, such as in its burning zone, or become part of cement kiln dust subsequently captured by electrostatic precipitators or by other collection methods prior to exiting the exhaust stack.

The various chemical reactions and clinker formation discussed herein occur in one or more zones of the cement kiln having suitable temperatures for the associated reactions. Thus the combustion zone refers to any region of the kiln having sufficiently high temperature to combust all or part of the fuel mixture, such as the zone at the burner tip or flame. The burning zone of a cement kiln may refer to a high temperature region, including not only the combustion zone, but also adjacent or additional regions within the kiln where reactions between the lime additive and fuel are occurring, where clinker is forming, or where clinker is being exposed to the chemical reactions related to the added lime, fuel, and other raw, intermediate, or resultant compounds. In many instances, the burning zone may generally extend along a given length of the kiln and include a clinkering bed where clinkering takes place.

The foregoing reactions lower the sulfur content of the exhaust gas, and thus reduce sulfur emissions, including sulfur dioxide (SO2), at the kiln stack. The above reactions may also aid in grinding operations associated with the cement making process, by generating additional gypsum particles in the clinker bed.

Because the burning zone may correspond to where the clinkering occurs, the calcium-containing sulfur compounds may fall to the clinker bed and some or all such compounds become resident in or on the clinker itself. For example, sulfur evolution from the combustion of the sulfur-containing fuel component, such as coal, may include sulfurous oxides that are reactable with the lime, such as calcium oxide derived from the lime component, to form calcium-containing sulfur compounds such as calcium sulfate.

FIG. 1 illustrates one implementation of a cement kiln system 10 integrated with a clinker production process utilizing a dry process rotary kiln 12 having a pre-heater tower 14 including a precalciner 16. The kiln 12 extends between a first end 18 and a second end 20. The processed raw meal or feed 22 is fed into the kiln at the second end 20 and is passed toward first end 18. A burner 24 is configured to combust a fuel mixture 26 received from a fuel supply 28 in a combustion zone 30 extending from a burner tip 32. Combustion of fuel mixture 26 or components thereof generates a burner flame 34 within the combustion zone 30 to generate a high temperature burning zone 36 along a surrounding region within the kiln 12.

Raw materials 38 are supplied to a raw mill 40 for grinding to produce a raw meal 42. The raw materials 38 may include various forms of limestone, clay, shale, slags, sand, mill scale, iron-rich material (IRM), pumice, bauxite, recycled glass, ashes, and similar materials. The raw meal 42 is then provided to the pre-heater tower 14. The pre-heater tower 14 applies heat to the raw meal 42, typically via hot gases 44 directed to the pre-heater tower 14 from the kiln 12 or a precalciner burner 46. For example, the pre-heater tower 14 may include a multi-staged arrangement of cyclones through which the raw meal 42 falls against a countercurrent of the hot gas 44 rising through the tower 14 to heat the raw meal 42. The applied heat may result in partial calcination of the raw meal 42.

A precalciner burner 46 is also included to provide additional heat to the raw meal 42 such that the raw meal 42 is substantially decarbonated before exiting the tower 14 as raw feed 22 and entering the cement kiln 12 at the second end 20. The flame temperature at the precalciner burner 46 may be about 1000° C. to about 1200° C. or otherwise configured to heat the raw meal 42 to above about 850° C. The temperature of the material feed 22 charge at the second end 20 of the kiln 12 may typically be between about 800° C. and about 900° C. It will be appreciated that system 10 and associated methods are exemplary only, and this disclosure may be applied to additional cement kiln systems and other types of cement kilns, including cement kilns that do not include a precalciner burner 46, wet process kilns, with or without a pre-heater tower 14 or other components described herein.

Gas temperatures within the kiln 12 typically increase from the second end 20 of the kiln through the burning zone 36 before decreasing at the first end 18. For example, gas temperatures along the second end 20 may be between about 1000° C. and about 1200° C. while gas temperatures in the burning zone 36 along the flame and in particular adjacent to the tip 32 may be between about 1800° C. and about 2000° C. Intermediate compounds 48 begin to form as the material feed 22 progresses along the second end 20 of the kiln 12 toward the burning zone 36. Within the burning zone 36, the feed material 22 reaches clinkering temperatures of about 1400° C. to about 1500° C. to form clinker 50*a* nodules forming a clinker bed 50*b* along the burning zone 36 of the kiln 12. When the clinker 50*a* exits the burning zone 36, the clinker 50*a* is generally in a hot molten state and begins to cool as it passes along the first end 18 and exits the kiln 12 to a cooler 52 for further processing 54, e.g., in a cement mill.

The fuel supply 28 is configured to provide the fuel mixture 26 to the burner 24 that is delivered into the combustion zone 30 extending from the burner tip 32 and is combusted therein.

In this implementation, the fuel mixture 26 comprises a sulfur-generating combustible fuel component and a lime component configured to reduce sulfur generated by the combustion and thermal decomposition of the sulfur-generating fuel component when the fuel mixture 26 is combusted. Prior to combustion of the fuel mixture 26, the lime component may be added to or otherwise introduced into the fuel supply 28, which may already include the combustible fuel component. For example, fuel mixture 26 supplied to kiln burner 26 may be formulated by directly introducing the lime component, preferably in a dry micronized form, to the combustible fuel component.

The term "lime" should be given its broadest reasonable meaning when used herein, unless the context suggests otherwise, and thus lime includes one or more of the following: calcium carbonate, calcium magnesium carbonate, limestone or limestone-containing materials, whether virgin or waste material, whether argillaceous or dolomitic, calcium oxide (sometimes referred to as "quicklime"), calcium hydroxide (sometimes referred to as "slaked lime"), or other calcium-containing inorganic materials in which carbonates, oxides, or hydroxides are present, including mixtures of any of the foregoing, and combinations of any of the foregoing with other compounds, whether in virgin, raw, or waste material, float, and the like. The lime component herein may comprise a lime, lime mix, or composition added to the combustible fuel component of the fuel mixture 26 prior to its being combusted in the combustion zone 30 within the burning zone 36, such that calcium oxide or other intermediate calcium-containing compounds are generated to react with the sulfur of the fuel.

In certain implementations, the lime component of the fuel mixture 26 is a waste material in which calcium carbonate predominates, and is in a micronized form having an average particle size of about 1.0 microns or less, such as about 0.5 microns or less, when the combustible fuel component of the fuel mixture 26 is combusted.

The amount of lime introduced to the fuel is comparatively small by weight of fuel, as the lime treatment is accomplished on a molar basis of the sulfur content of such fuel. So, by way of non-limiting example, given cement kiln system 10 burning 120,000 tons per year of coal having sulfur content averaging 2% as measured in accordance with industry practice, lime is introduced at rates and times to total 1,200 tons per year, in accordance with one suitable method, which has been found sufficient to generate gypsum as discussed above, and which thereby removes sulfur from the exhaust gas. The amount of reduction of sulfur dioxide in the exhaust gas has been found to correspond to what would have been produced had coal with one percent (1%) less sulfur been used as the fuel without the lime additive process. In other words, introducing lime on a molar basis at one percent of the tonnage of coal, as set out in the above example, approximates the lower sulfur dioxide emissions of coal having one percent less sulfur prior to combustion. It should be understood that the quantities of lime introduced on a molar basis to the sulfur in the fuel may be varied depending on many factors, including the composition of raw materials, fuel, kiln parameters, etc., By coupling the clinkering process occurring within the burning zone 36 with the combustion of the sulfur-containing fuel component and with the micronized lime, the sulfur from the fuel component will combine with the lime itself to form calcium-containing sulfur compounds, such as gypsum.

At least a portion of such calcium-containing sulfur compounds fall to the clinker bed 50b, and may aid in subsequent grinding of clinker 50a, or such compounds may also become part of the clinker 50a forming on the clinker bed 50b along burning zone 36 of the kiln 12. Still other portions of the calcium-containing sulfur compounds produced in the process and system disclosed herein exit with the exhaust gas but are particulate in nature so as to be collected with the cement kiln dust generated by system 10, as detailed below. Regardless of their exact chemical formulation or location, the calcium-containing sulfur compounds thus formed cause sulfur dioxide exiting the kiln stack to be reduced from what it would have otherwise been absent employing the process disclosed herein.

Accordingly, the system 10 and method may effectively reduce the sulfur emissions, such as sulfur dioxide, at the stack 58 by preventing emission of such sulfur from the kiln 12 or even formation of such sulfur emissions in the first place. The method may further reduce collection and disposal costs by incorporating the sulfur reduction products, e.g., calcium-containing sulfur compounds, within the clinker 50a forming the clinker bed 50b. Within the burning zone 36, for example, the hot or molten clinker 50a forms a clinker bed 50b effectively beneath the flame 34 where the sulfur reduction reaction is occurring. It is to be appreciated that in some instances the calcium-containing sulfur compounds may be passed to or diverted into the forming clinker 50a of the clinker bed 50b within the burning zone 36.

In normal operation, the cement kiln exhaust gas 44 is passed from the kiln 12 through one or more processes, ducts, mills, cyclones, particulate collection systems such as kiln bag houses, ESPs, or other particulate collection systems to capture or collect all or a portion of the particulates within the exhaust gas. As shown, the hot exhaust gas 44 flows counter to the direction of the kiln feed 22 and exits the kiln 12 from the second end 20 to the preheating tower 14 for use in heating or drying processes. The exhaust gas 44 may then be passed through a particulate collection system such as a baghouse 60 to collect particulates within the exhaust gas 44 prior to emission of filtered gas components 44a from the kiln stack 58. The collected particulate is typically a material referred to as cement kiln dust (CKD) 62. Generally, CKD 62 is a particulate mixture, including, amongst its constituents, partially calcined and unreacted raw feed, clinker dust and ash, enriched with alkali sulfates, halides, trace metals. In certain implementations, a portion of the calcium-containing sulfur compounds formed in the burning zone 36 may include particulates exiting the kiln 12 within the exhaust gas 44 and which may be collected with and become resident in the CKD 62 within the above-described kiln operations. The sulfur thus collected in CKD 62 thus does not exit the kiln stacks and thus may be processed in any number of ways, including transferring to storage for controlled metering back into the raw mill 40, or cement grinding mill, using the CKD as a filler material within a concrete batch plant, asphalt plant, or landfilling.

The methods and systems for treating cement kiln fuel set out in this disclosure may be employed regardless of the specific firing systems employed by the cement kiln, and in any number of kiln and related system configurations. Lime may be added to the fuel mixture, whether used in a direct fire system (in which coal or other solid carbonaceous material in the fuel mixture is conveyed to the burner after grinding) or in an indirect fire system (in which the fuel mixture is stored after grinding.) Preprocess coal may be ground in a fuel mill to produce a ground composition that may be included alone or as part of a fuel mixture pneumatically passed to the burner for combustion. Additional components suitable for a fuel mixture such as biomass, construction materials, alternative fuels, etc. may be included in the fuel mixture with the preprocess or processed coal.

Figure 2:
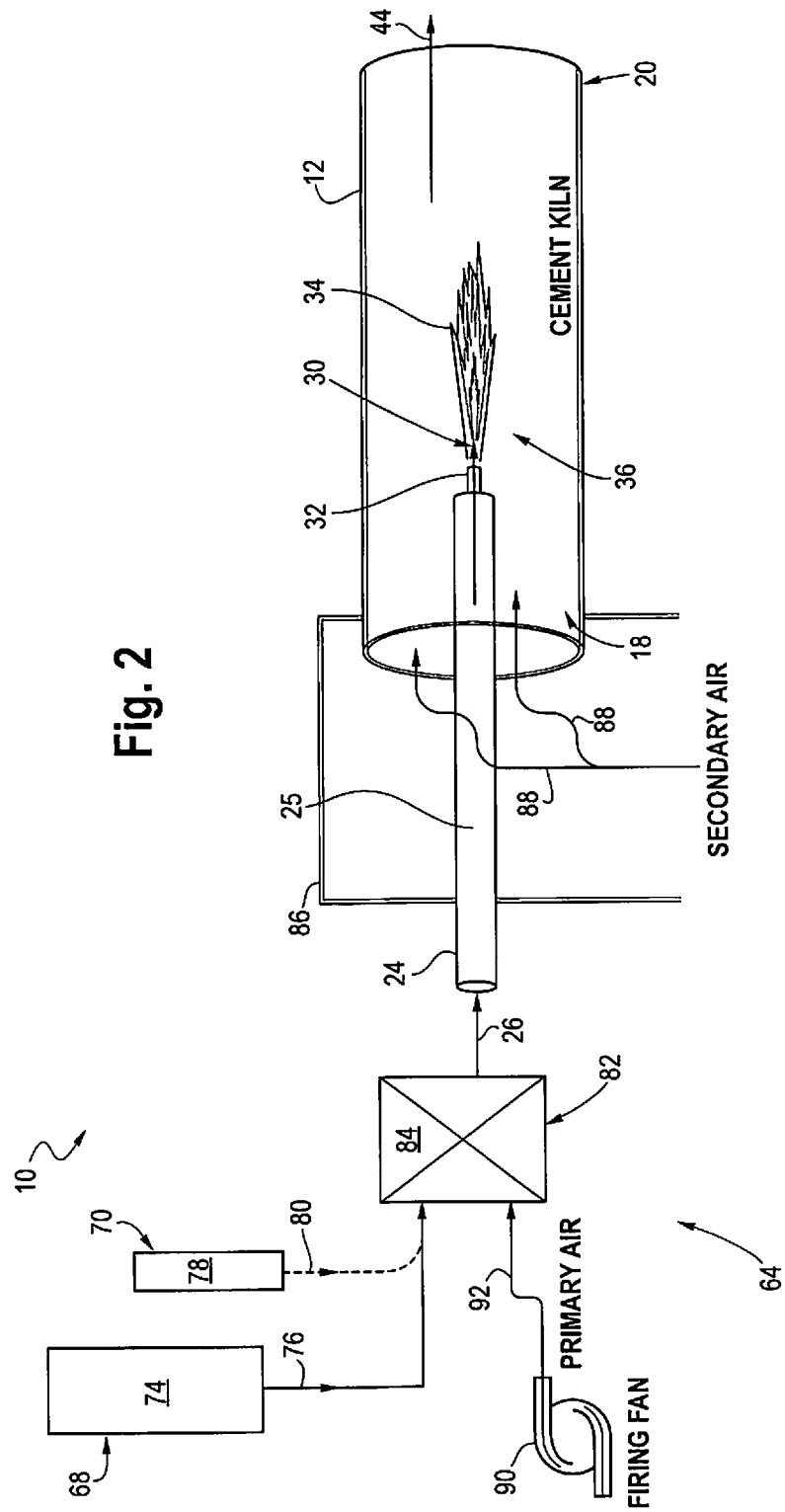
FIG. 2 illustrates a cement kiln system including a direct firing fuel system according to various embodiments described herein.
Figure 3:
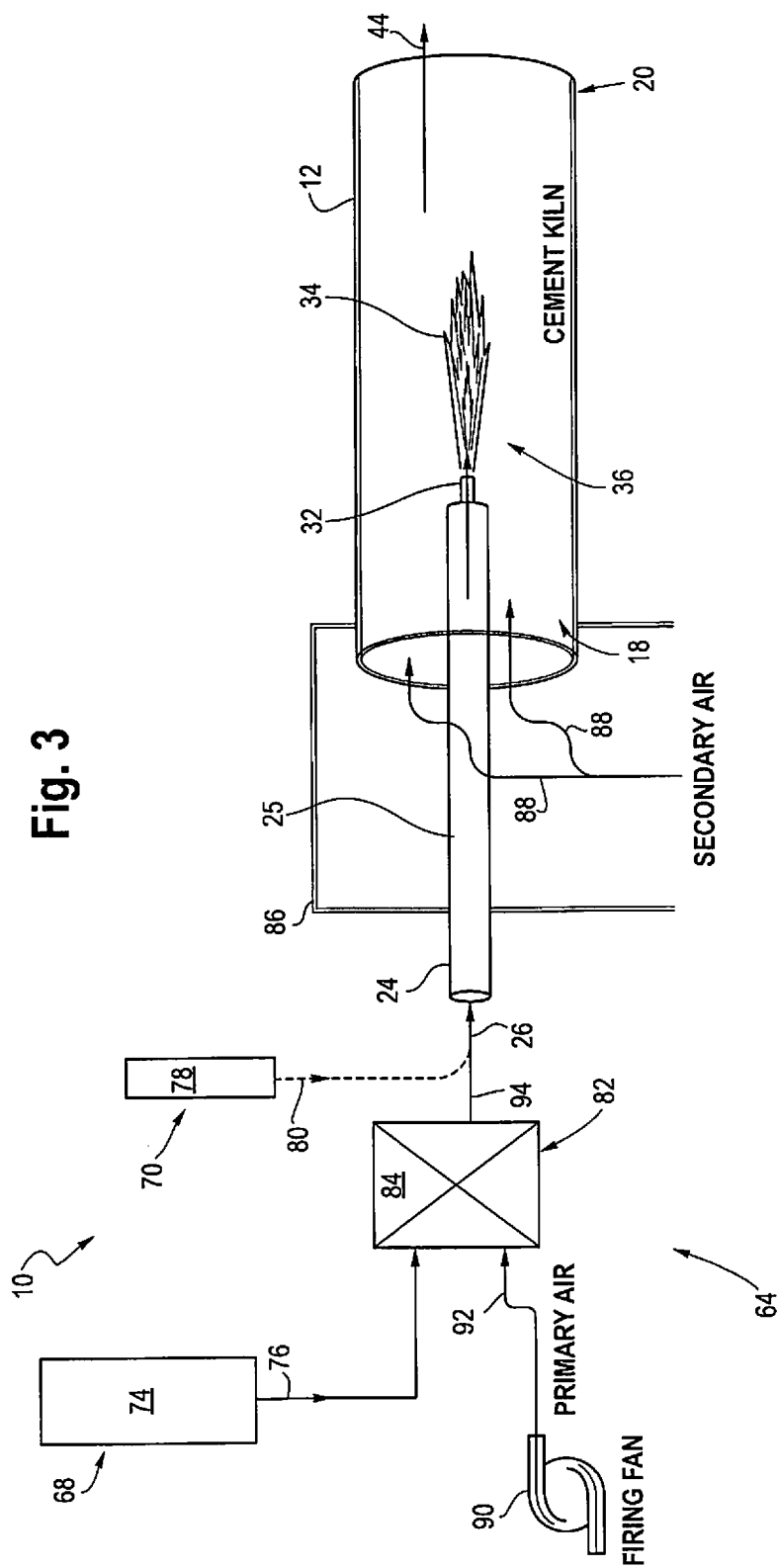
FIG. 3 illustrates a cement kiln system including a direct firing fuel system according to various embodiments described herein.

FIGS. 2-3 illustrate various implementations of cement kiln system 10 configured for direct fuel firing 64, and FIGS.

4-5, for indirect fuel firing processes 66. The illustrated embodiments include a fuel source 68, an additive source 70, and a fuel processor 82. The fuel source 68 may comprise one or more storage units 74 configured for storing a sulfur-generating fuel component 76 in a preprocessed form. The additive source 70 may comprise one or more additive storage units 78 storing an additive comprising the lime component 80, which in certain embodiments may be in a preprocessed form or otherwise suitable for interprocessing with the fuel component 76 by a fuel processor 82. It is to be appreciated that the fuel component 76 may comprise a combination of combustible fuels, one or more of which may be the sulfur-generating fuel component. Fuel processor 82 may comprise a fuel mill 84 configured to grind the fuel component 76. However, fuel processor 82 and associated processing of the fuel component 76 may comprise other known fuel processing techniques including combining one or more fuels or bringing about a physical or a chemical alteration to one or more of the fuels of the fuel component 82.

The illustrated embodiments also include a burner 24 comprising a burner pipe 25 extending into a first end 18 of a rotary kiln 12. The burner 24 is configured to receive the fuel mixture 26 and combust the fuel component 76 in the presence of the lime component 80 in a combustion zone 30 located adjacent to a burner tip 32 within a burning zone 36 of the kiln 12. The combustion results in a flame 34 within the kiln 12 corresponding to the burning zone 36 as described above with respect to FIG. 1. While various configurations may be used, a kiln hood 86 is shown positioned at the first end 18 of the kiln 12. A secondary air flow 88 may be provided through the kiln hood 86 and the first end 18 of the kiln 12 to maintain a counter-current flow of air and exhaust gas 44 through the kiln 12 and out the second end 20.

FIG. 2 illustrates one embodiment of a cement kiln system 10 configured for direct fuel firing 64. In this configuration, the lime component 80 is introduced to the preprocess fuel component 76 at or prior to the fuel mill 84. The resulting mixture is then processed by intergrinding in the fuel mill 84. In various embodiments, intergrinding may be used to reduce the average particle size of the lime component 80 to about 1.0 microns or less, or to about 0.5 microns or less. In other embodiments, the lime component 80 may be introduced to the preprocess fuel component 76 in a micronized form having an average particle size of about 1.0 microns or less, or about 0.5 microns or less. The processed fuel mixture 26 may be sent directly from the fuel mill 84 to the burner 24 for combustion. A firing fan 90, for example, may be used to produce a primary air flow 92 that incorporates and carries the fuel mixture 26 within a pneumatic stream to the burner 24 for combustion.

The embodiment illustrated in FIG. 3 is similar to the embodiment illustrated in FIG. 2 except the lime component 80 is introduced into a processed fuel component 94. Accordingly, the fuel mixture 26 may include addition of the lime component 80 directly into the fuel component 94 as it is passed within a pneumatic air flow for direct firing from the fuel mill 84 to the burner 24 for combustion.

Figure 4:
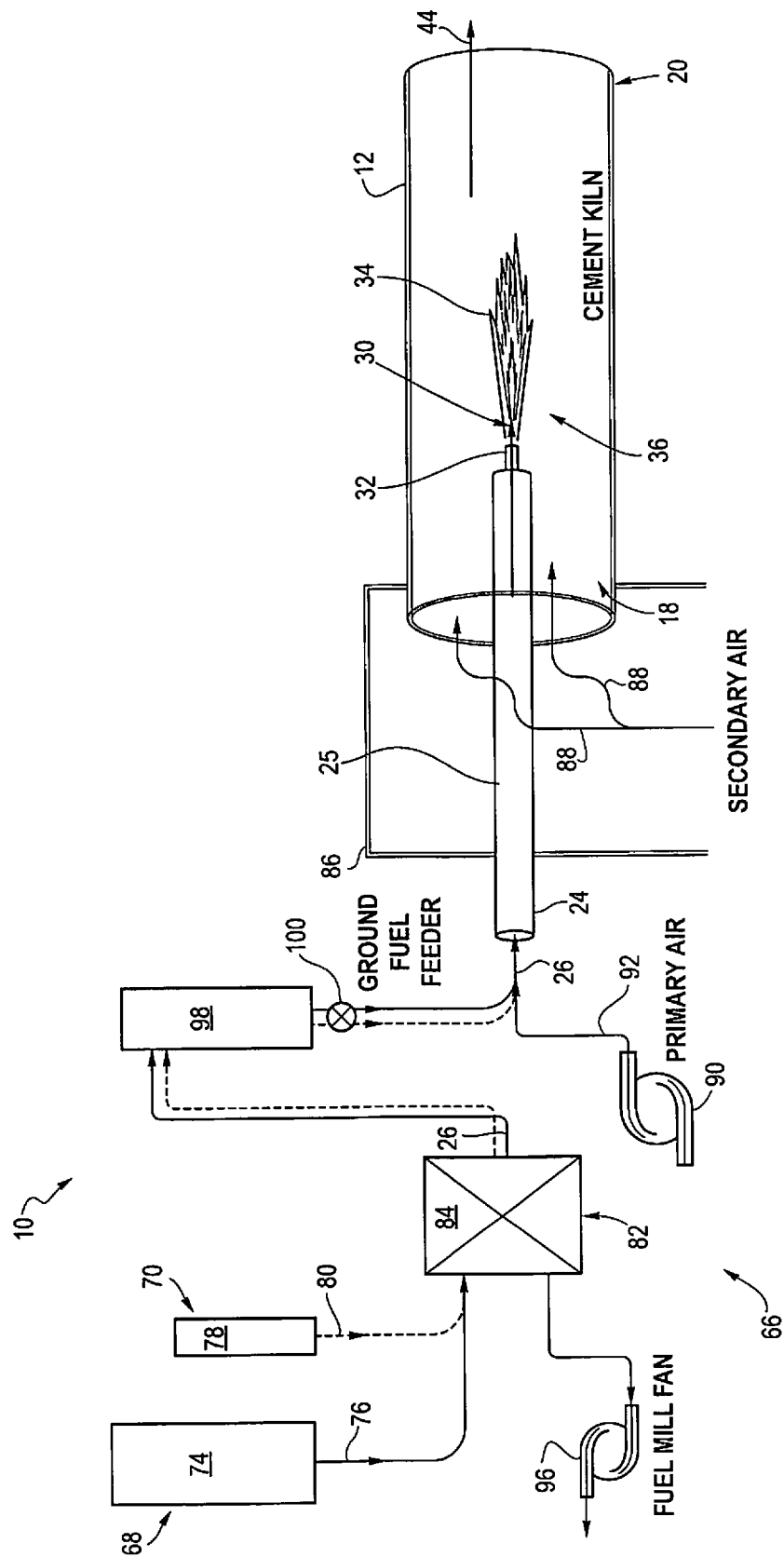
FIG. 4 illustrates a cement kiln system including an indirect firing fuel system according to various embodiments described herein.

FIG. 4 illustrates an embodiment of a cement kiln system 10 configured for indirect fuel firing 66. In this embodiment, a fuel mill fan 96 is coupled with the fuel mill 84 and the firing fan is positioned to produce the primary air flow 92 that incorporates and carries the fuel mixture 26 within a pneumatic stream to the burner 24 for combustion of the fuel component 76 from a storage unit 98 storing the fuel mixture 26. The storage unit 98 is positioned to receive the fuel mixture 26 from the fuel mill 84. The stored fuel mixture may be metered to the burner by a fuel feeder 100 in cooperation with the firing fan 90. Similar to the embodiment of FIG. 2, the lime component 80 may be introduced to the preprocess fuel component 76 at or before the fuel mill 84 for intergrinding of the mixture in the fuel mill 84.

Figure 5:
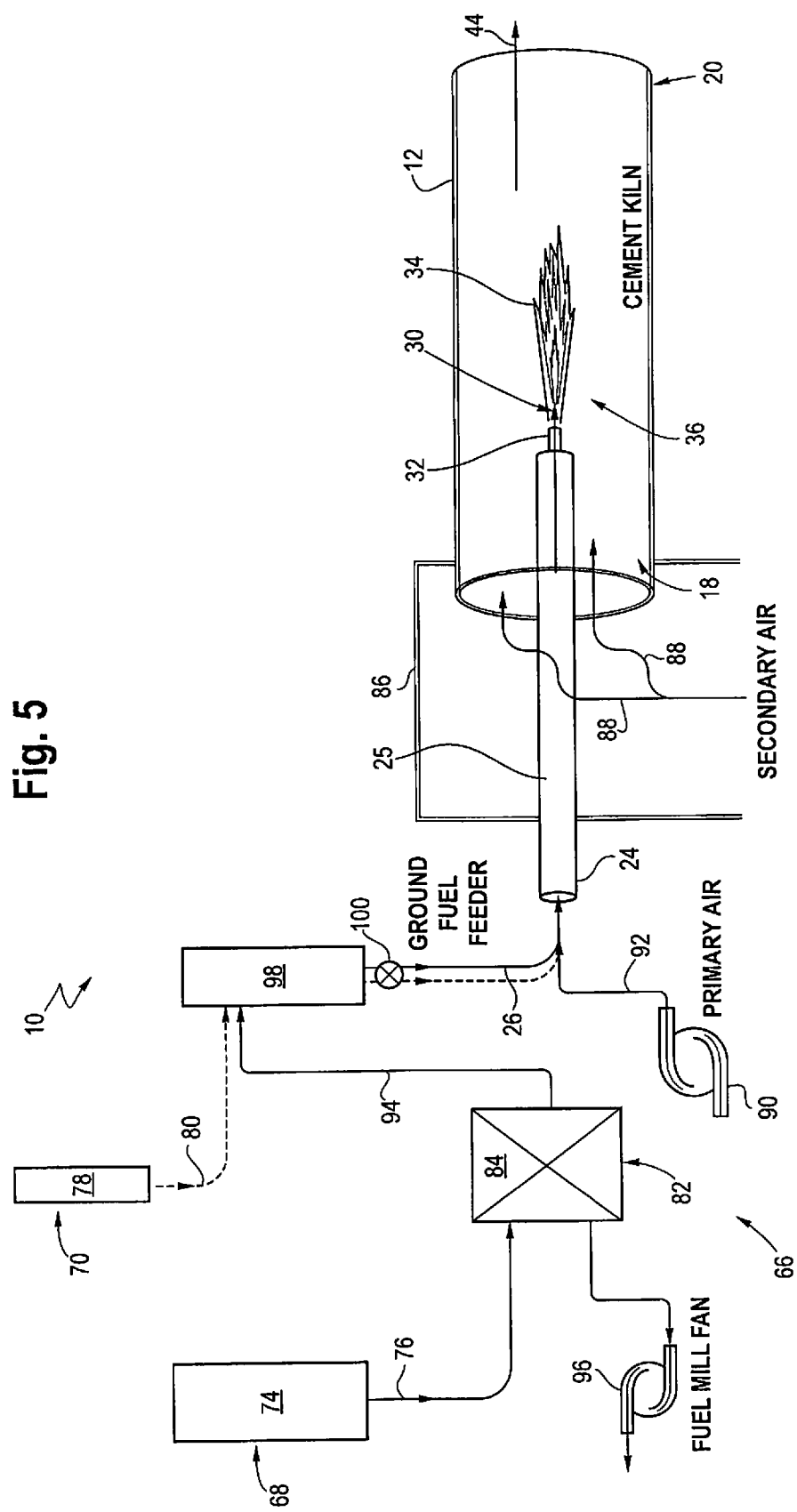
FIG. 5 illustrates a cement kiln system including an indirect firing fuel system according to various embodiments described herein.

The embodiment illustrated in FIG. 5 is similar to the embodiment illustrated in FIG. 4 and is configured for indirect fuel firing 66. In this embodiment, however, the lime component 80 is introduced to the fuel component 94 after the fuel mill 84. Accordingly, the lime component 80 may be introduced directly into the storage unit 98 storing the processed fuel component 94. Other configurations may also be used. For example, the lime component 80 may be introduced to the processed fuel mixture 94 as it is passed from the fuel mill 84 to the storage unit 98. In another configuration, the lime component 80 may be added to the fuel component 94 as the fuel component 94 is being passed from the storage unit 98 to the burner 24 for combustion.

The various implementations of the cement kiln system and related methods may result in a reduction of sulfur dioxide or other reducing sulfur emissions from the cement kiln irrespective of whether the kilns employ direct or indirect fuel firing processes.

Systems and methods disclosed herein may reduce a sulfur emitted from a cement kiln 12, and may include addition of a lime component 80 to a fuel component 76 comprising a sulfur-generating fuel wherein the additive addition occurs at any point prior to combustion of the fuel mixture 26. The presence of the lime component 80 in the combustion zone 30 results in formation of calcium-containing sulfur compounds as particulates. Beneficially, the sulfur reduction may be conducted within a typical clinker production process, which will typically include complete combustion of the fuel in the combustion zone 30. For example, the fuel mixture 26 may be used in existing plants with little to no retrofitting. As a further example, the calcium-containing sulfur compounds formed in the burning zone 36 may be removed as part of the normal production process as particulate encapsulated or as a chemical component of the clinker or CKD.

In one implementation, sulfur emissions of coal having a given percentage of sulfur content have been shown to be reduced by 1% upon addition of micronized lime at rates and quantities on a molar basis of the same order of magnitude corresponding to the sulfur content of the coal.

The systems and methods disclosed herein have been identified, adapted to, and designed for the cement industry. In one form, the systems, methods, and processes disclosed herein may provide a lower capital costs, operating costs, and sulfur emissions.

It should be appreciated that a version of this technology can also be applied to clinker production plants equipped with wet process kilns that do not include a pre-heater tower. While the disclosed systems and methods may generally be implemented in modern kiln operations with little retrofitting, retrofitting of existing facilities is expressly among the possible configurations.

The matter set forth in the foregoing description and accompanying drawings is offered by way of illustration only and not as a limitation. While the systems, methods, and apparatuses for cement kiln exhaust gas pollution reduction have been described and illustrated in connection with certain embodiments, many variations and modifications will be evident to those skilled in the art and may be made without departing from the spirit and scope of the disclosure. The disclosure is thus not to be limited to the precise details of methodology or construction set forth above as such variations and modification are intended to be included within the scope of the disclosure.

What is claimed is:

1. A cement kiln system, the system comprising:
a fuel supply configured to supply a fuel component, the fuel component comprising a sulfur-generating combustible fuel;
an additive supply configured to supply a micronized lime component contained in a liquid carrier to the fuel component to form a fuel mixture, wherein the liquid carrier is formulated to evaporate prior to delivering the fuel mixture into the cement kiln system;
a raw mill configured to receive and grind raw materials to produce a raw meal;
a pre-heater configured to receive the raw meal from the mill and pre-heat the raw meal;
a pre-calciner burner included in the pre-heater configured to substantially de-carbonate the raw meal to form raw feed;
a cement kiln comprising a burner having a burner tip positioned to deliver the fuel mixture into the cement kiln and configured to combust the fuel component therein to produce a flame that generates a burning zone within the cement kiln, and wherein the cement kiln is configured to receive within the burning zone the raw feed from the pre-heater, and wherein sulfur generated by the combustion of the fuel component in the presence of the raw feed and lime provided by the micronized lime component form calcium-containing sulfur compounds and clinker within the burning zone when the fuel component is combusted; and
a clinker bed extending beneath the burning zone, wherein the clinker bed is positioned to catch the calcium-containing sulfur compounds and the clinker falling to the clinker bed,
wherein kiln exhaust gas exits the cement kiln and is passed directly to the pre-heater for use in pre-heating the raw meal.

2. The system of claim 1, wherein the micronized lime component has an average particle size of about 1.0 microns or less.

3. The system of claim 1, wherein the micronized lime component comprises at least one of a calcium oxide, a calcium hydroxide, and a calcium carbonate.

4. The system of claim 1, further comprising a fuel mill, wherein the fuel mill is coupled to the fuel supply to receive the fuel component.

5. The system of claim 4, further comprising a storage unit coupled to the fuel mill for storing the fuel component.

6. The system of claim 4, wherein the additive supply is configured to supply the micronized lime to the fuel component after the fuel mill to form the fuel mixture.

7. The system of claim 1, wherein the micronized lime is obtained from a calcium carbonate waste process.

8. The system of claim 1, wherein the burner tip is further configured to combust the fuel component to form gypsum that is deposited on at least one selected from the group of the clinker bed and the clinker formed on the clinker bed.

9. The system of claim 1, wherein the micronized lime component has an average particle size of about 0.5 microns or less.

10. The system of claim 1, wherein further calcium-containing sulfur compounds exiting the kiln become resident in cement kiln dust that is collected by a particulate collection system.

11. The system of claim 1, wherein the pre-heater further comprises a pre-heater tower that includes a multi-staged arrangement of cyclones through which the raw meal falls against a counter-current of the hot gas rising through the pre-heater tower to heat the raw meal.

12. The system of claim 1, wherein the pre-calcinator comprises a burner having a flame temperature of about 1000° C. to about 1200° C. configured to heat the raw meal to above 850° C.

13. The system of claim 1, wherein a gas temperature proximate the second end of the cement kiln is between about 1000° C. to about 1200° C.

14. The system of claim 1, wherein a gas temperature within the burning zone is between about 1800° C. to about 2000° C.

15. The system of claim 1, wherein within the burning zone the raw material reaches a clinkering temperature of about 1400° C. to 1500° C. to form the clinker.

16. The system of claim 1, wherein the fuel mixture is formed, immediately prior to entering a burner pipe of the burner using pneumatic air flow and absent subjecting the micronized lime component to a fuel mill.

17. A method of treating cement kiln fuel, the method comprising:
grinding raw materials to produce a raw meal;
pre-heating the raw meal in a pre-heater including a pre-calciner for pre-calcinating the raw meal to substantially de-carbonate the raw meal to form raw feed;
adding micronized lime contained in a liquid carrier directly into a sulfur-generating combustible fuel to treat the fuel, wherein the liquid carrier is evaporated prior to delivering a fuel and micronized lime mixture to a burner within a cement kiln;
receiving the raw feed within a cement kiln;
combusting the fuel and micronized lime mixture and the raw feed in a cement kiln to form calcium-containing sulfur compounds and clinker, wherein at least a portion of the calcium-containing sulfur compounds fall to a clinker bed that forms along a burning zone within the kiln; and
passing kiln exhaust gas exiting the cement kiln directly to the pre-heater for use in the pre-heating of the raw meal.

18. The method of claim 17, further comprising obtaining the micronized lime from a calcium carbonate waste process.

19. The method of claim 17, further comprising collecting the calcium-containing sulfur compounds resident in cement kiln dust with a particulate collection system.

20. The method of claim 17, wherein the micronized lime comprises a lime component.

21. The method of claim 17, wherein the micronized lime comprises at least one of a calcium oxide, a calcium hydroxide, and a calcium carbonate; and
wherein the step of combusting the fuel comprises the step of combusting the fuel to form gypsum at a location to become deposited on at least one of the clinker bed or clinker thereon.

22. The method of claim 17, wherein the step of adding micronized lime includes adding the micronized lime to coal.

23. The method of claim 17, wherein a further portion of the calcium-containing sulfur compounds exiting the kiln become resident in cement kiln dust.

24. The method of claim 17, wherein the fuel comprises at least one dry process fuel selected from coal, petcoke, biomass, agriculture byproducts, paper ash, paper, saw dust, and construction materials.

25. The method of claim 17, wherein adding the micronized lime comprises introducing the micronized lime to the fuel after a fuel mill.

26. The method of claim 17, wherein the method further comprises storing the fuel in a storage unit.

* * * * *